United States Patent [19]

Drexel

[11] E Re. 31,570

[45] Reissued May 1, 1984

[54] FLUID FLOWMETER

[75] Inventor: Charles F. Drexel, Los Angeles County, Calif.

[73] Assignee: Tylan Corporation, Carson, Calif.

[21] Appl. No.: 346,422

[22] Filed: Feb. 5, 1982

Related U.S. Patent Documents

Reissue of:

[64] Patent No.: 3,851,526
Issued: Dec. 3, 1974
Appl. No.: 349,169
Filed: Apr. 9, 1973

[51] Int. Cl.[3] ..... G01F 5/00

[52] U.S. Cl. ..... 73/202; 138/42

[58] Field of Search ..... 73/202, 203, 204; 138/40, 42, 43, 44

[56] References Cited

U.S. PATENT DOCUMENTS

| | | | |
|---|---|---|---|
| 76,166 | 5/1868 | Cordman . | |
| 163,929 | 6/1875 | Herriott . | |
| 1,140,548 | 5/1915 | Vogelsang . | |
| 1,142,674 | 6/1915 | Crouch . | |
| 1,178,891 | 4/1916 | Walther . | |
| 1,559,547 | 11/1925 | Brown | 73/861.61 |
| 1,687,780 | 10/1928 | Neale . | |
| 1,701,805 | 2/1929 | Dunn et al. . | |
| 1,814,235 | 7/1931 | Trogner . | |
| 1,816,390 | 7/1931 | Mobus . | |
| 1,870,849 | 8/1932 | Hodgson | 138/37 |
| 1,883,813 | 10/1932 | Morrison . | |
| 2,132,011 | 10/1938 | Bennett et al. . | |
| 2,163,730 | 6/1939 | Goetzl . | |
| 2,515,394 | 7/1950 | Clarkson . | |
| 2,604,958 | 7/1952 | Leufvenius . | |
| 2,661,768 | 12/1953 | Novak et al. . | |
| 2,687,645 | 8/1954 | Velten et al. . | |
| 2,760,371 | 8/1956 | Borden . | |
| 2,815,923 | 12/1957 | Clark . | |
| 2,887,129 | 5/1959 | Stear . | |
| 2,893,432 | 7/1959 | Gibson . | |
| 2,927,462 | 3/1960 | Li . | |
| 2,929,248 | 3/1960 | Sprenkle . | |
| 3,027,746 | 4/1962 | Kappel . | |
| 3,071,001 | 1/1963 | Goldsmith . | |
| 3,071,160 | 1/1963 | Weichbrod | 73/861.52 X |
| 3,129,587 | 4/1964 | Hallanger . | |
| 3,330,156 | 7/1967 | Thomas . | |
| 3,349,619 | 10/1967 | Millar . | |
| 3,433,068 | 3/1969 | Werner . | |
| 3,514,074 | 5/1970 | Self . | |
| 3,559,482 | 2/1971 | Baker et al. . | |
| 3,613,448 | 10/1971 | Benson et al. | 73/861.42 |
| 3,688,800 | 9/1972 | Hayner et al. . | |
| 3,722,854 | 3/1973 | Parola . | |
| 3,792,609 | 2/1974 | Blair et al. . | |
| 3,805,610 | 4/1974 | Jacobs | 138/43 |

FOREIGN PATENT DOCUMENTS

| | | |
|---|---|---|
| 251194 | 4/1926 | United Kingdom . |
| 520083 | 4/1940 | United Kingdom . |

*Primary Examiner*—Herbert Goldstein
*Attorney, Agent, or Firm*—Nilsson, Robbins, Dalgarn, Berliner, Carson & Wurst

[57] ABSTRACT

A flowmeter in which a laminar flow conduit is connected in parallel to a flow restrictor comprising at least one disk having an opening through opposite surfaces and at least one conduit from the opening to the perimeter of the disk, each conduit having an effective length to diameter ratio sufficient to assure laminar fluid flow.

10 Claims, 15 Drawing Figures

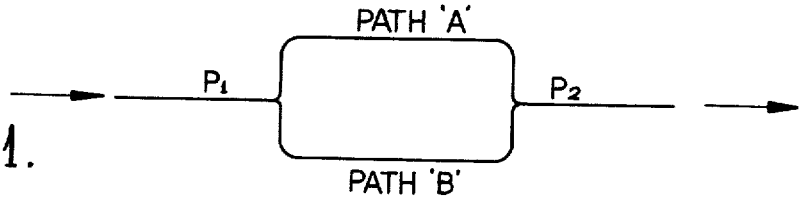
FIG.1.
FIG.2.
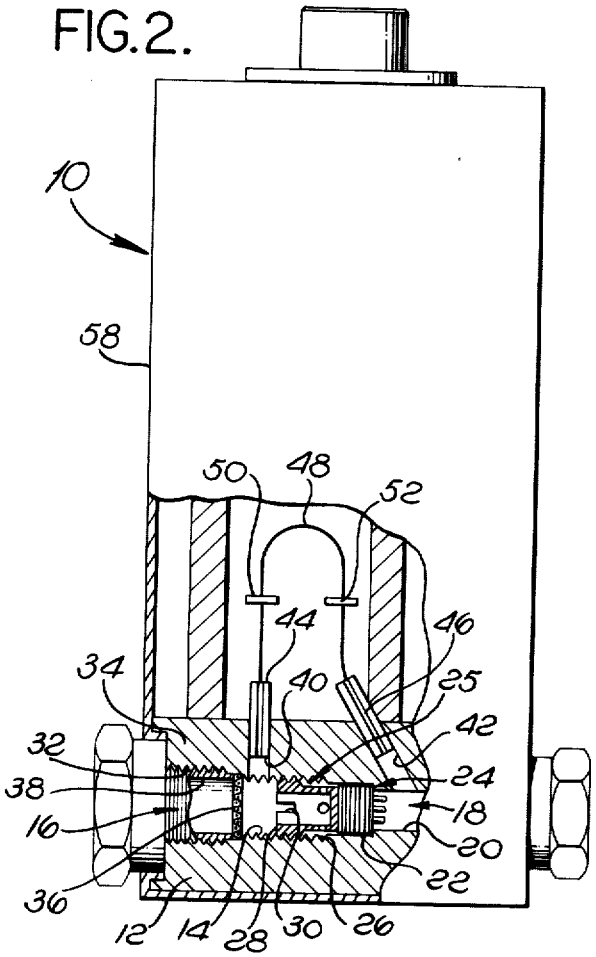
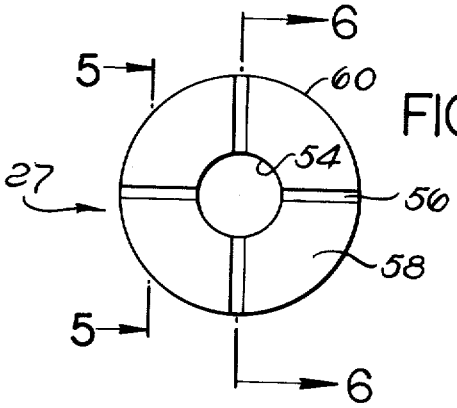
FIG.4.
FIG.5.
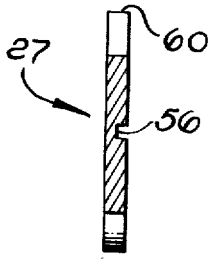
FIG.6.
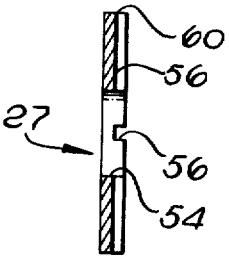
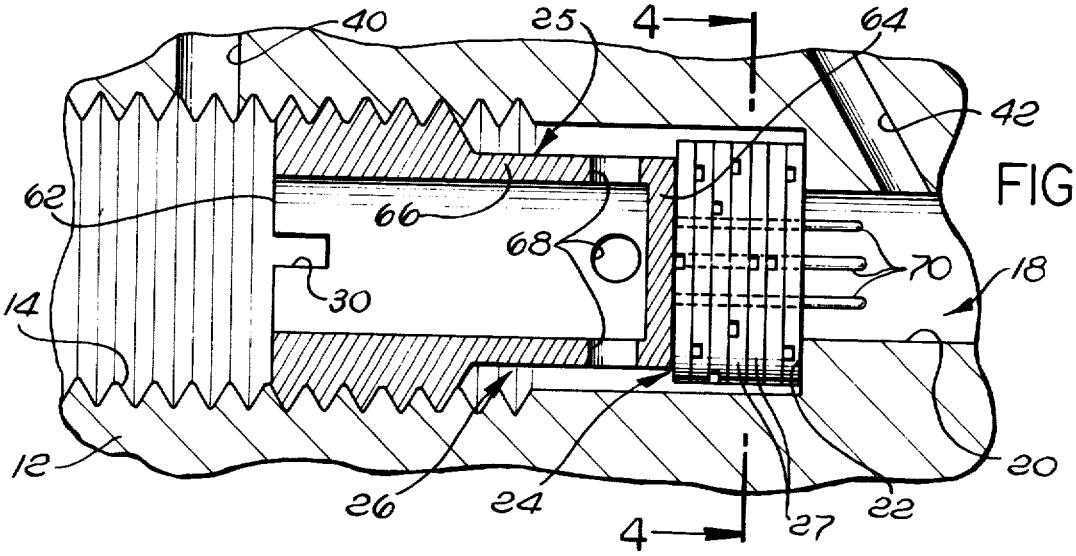
FIG. 3.

FLUID FLOWMETER

Matter enclosed in heavy brackets [ ] appears in the original patent but forms no part of this reissue specification; matter printed in italics indicates the additions made by reissue.

FIELD OF THE INVENTION

The fields of art to which the invention pertains include the fields of pressure differential measuring and testing devices, flowmeters and conduit restrictors and flow elements.

BACKGROUND AND SUMMARY OF THE INVENTION

The prior art has developed a variety of linear flowmeters in which a manometer or other device for measuring a pressure differential is connected across opposite sides of a flow restrictor. The restrictor comprises one or more passageways proportioned so that under normal working conditions the resistance to flow through the resistor as a whole is substantially proportional to the rate of flow. There are certain levels of inaccuracies inherent in such devices and methods have been developed to optimize the accuracy of results obtained. See for example Goldsmith U.S. Pat. No. 3,071,001 and Weichbrod U.S. Pat. No. 3,071,160. See also application Ser. No. 141,897, now U.S. Pat. No. 3,792,609 entitled Flow Splitter by R. F. Blair, R. J. Hill and D. B. Le May of common assignment to the present application.

In certain applications the flow rate of a fluid is measured not by directly determining the pressure differential across a restrictor, but by measuring the actual flow of a small portion of fluid. Such applications require that the flow of the fluid be divided into two or more paths with an exact ratio maintained between the individual path flow rates. In a typical situation, such as in a mass flowmeter, a very small percentage of the flow is diverted into a measuring section. This percentage may be as small as 1 part in 40,000 and the flow measuring section is typically a very thin tubular conduit which is much longer that its diameter so that laminar flow prevails throughout the conduit. During laminar flow of a fluid, the flow rate is directly proportional to pressure drop and inversely proportional to viscosity. In contrast, during turbulent flow, the flow rate is proportional to the square root of pressure drop and largely independent of viscosity. Therefore, in the design of a flowmeter in which the flow is split along parallel paths, it is important to provide conditions that will assure laminar flow in each path. Since the measuring section flow is laminar, if the bypass flow were turbulent the flow ratio would be a function of viscosity and would have an undesirable dependency upon temperature and pressure. Such flow splitters are thus much more prone to inaccuracies as a result of geometric configuration than are pressure differential devices.

In the above-mentioned application Ser. No. 141,897 a number of devices are disclosed incorporating a plurality of closely spaced fluid passageways, e.g., defined by a plurality of screens, each passageway defining a laminar flow path. Generally, improvements over prior devices is thus obtained, but the pressure drop is influenced by the compressive force used to assemble the device and by variations in screen mesh. The effective diameters are quite small, which can result in trapping of contaminants and resulting plugging.

The present invention provides simple and economical methods for assuring laminar flow in both the measuring section and bypass section of a flow splitter so that a constant and predetermined ratio is maintained across the entire range of flow rates to be measured. The present construction overcomes the disadvantages referred to above and additionally provides a wide range of flow, as high as 1,000:1 or higher, obtained with facility and repeatable accuracy. This has been accomplished by using as a flow restrictor one or a juxtaposed plurality of disks, each having one or a plurality of channels formed from its perimeter to an opening through opposite sides of the disk. Fluid is directed to the perimeter of the disk or disks and is conveyed by the conduits to the opening. The conduits have sufficiently large length to diameter ratios (or length to effective hydraulic radius, as defined hereinafter) to assure laminar flow of the fluid. In an exemplary embodiment, the flow restrictor comprises flat, smooth sided juxtaposed disks, formed with central, aligned openings. The central opening in each disk communicates via one or more conduits radiating from the central opening to the perimeter of the disk.

By juxtaposing a predetermined number of disks having a predetermined number and shape of conduit, one can achieve any flow ratio desired. There is only one flow path, radially inward (or outward if flow is reversed); therefore, the passage size can be precisely controlled. Furthermore, the conduits have sufficient diamter so that plugging by contaminants can be avoided. The entire construction can be made of metal and can be tightly assembled so that seals are not required, enabling its use with otherwise corrosive fluids.

The flow restrictor is combined with an elongate laminar flow conduit, serving as a measuring section, to form a substantially linear flowmeter. Such a meter includes a housing having a fluid inlet and fluid outlet, the housing defining a fluid path between the inlet and outlet. The flow restrictor is disposed in this fluid path in parallel circuit with the measuring section conduit. Means are provided for measuring the rate of flow of fluid through the measuring section conduit, which means are known in the prior art and constitute no part of the present invention. The result is a compact structure of simple construction which demonstrates high accuracy in measurements over a substantial range of flow temperature and pressure conditions.

BRIEF DESCRIPTION OF THE DRAWINGS

FIG. 1 is a schematic representation of the fluid flow paths in a flow divider;

FIG 2 is a schematic illustration in cross-section of portions of a flowmeter incorporating a flow restrictor of this invention;

FIG. 3 is an enlarged cross-sectional view of the flow restrictor portion of the flowmeter of FIG. 2;

FIG. 4 is a front elevational view of an exemplary flow restrictor disk used in the flow element of FIG. 3, taken on the line 4—4 of FIG. 3.

FIG. 5 is a cross-sectional view of the flow restrictor disk of FIG. 4, taken on line 5—5 of FIG. 4;

FIG. 6 is a cross-sectional view of the flow restrictor disk of FIG. 4, taken on line 6—6 of FIG. 4;

DETAILED DESCRIPTION

Figure 7:
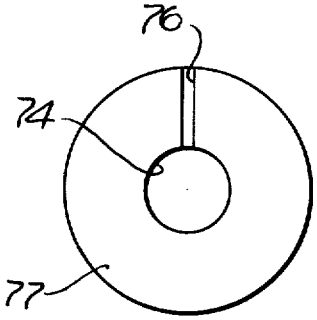
FIGS. 7-14 are front views of alternative flow restrictor disks.

As required, details of illustrative embodiments of the invention are disclosed. However, it is to be understood that these embodiments merely exemplify the invention which may take forms different from the specific illustrative embodiments disclosed. Therefore, specific structural and functional details are not necessarily to be interpreted as limiting, but as a basis for the claims.

The invention will first be described with respect to a particular type of restrictor or flow element disk as illustrated in FIGS. 2–6. Subsequently, alternative disk configurations will be described as illustrative in FIGS. 7–15. The invention will be described with respect to fluid flowing from left to right in FIGS. 1–3, but the devices described herein are as effective with a reverse fluid flow.

Referring to FIG. 1, fluid paths A and B constitute the flow through a flowmeter from the inlet at $P_1$ to the outlet $P_2$. The line labeled PATH A represents fluid flow through the measuring section of the flowmeter and the line designated PATH B represents fluid flow through the bypass section of the flowmeter. The pressure drop is the same across each path. It is desired to have the flow rate in PATH A divided by the flow rate in PATH B be a constant at all times. In the particular embodiments illustrated herein, PATH A is a tube of sufficient elongation to assure laminar flow. PATH B must also assure laminar flow, otherwise the flow ratio would have an undesirable dependency upon temperature and pressure.

Flow through channel may be characterized by the nondimensional parameter known as the Reynold's number where $$R = 4m\phi v_m/u$$

where $\phi$ is the density of the fluid, $v_m$ is the mean velocity in the conduit, u is the fluid viscosity and m is the hydraulic radius defined as the conduit are a divided by the conduit perimeter. The effective diameter of the conduit can be considered to be 4m. The Reynold's number expresses the ratio of the inertia forces to the viscous forces in the fluid. For low values of R, the flow is laminar, while for high values of R, inertia forces predominate and the flow tends to be turbulent. The Reynold's number transition generally occurs in the range of about 1,600 to about 2,800 Reynold's number. For any particular structure, the transition Reynold's number can be determined by noting the mean velocity at which fluid of known density and viscosity flows in a turbulent manner and applying the information to the formula set forth above. The following embodiments illustrate a number of specific structures to accomplish laminar flow in the bypass section, PATH B, in combination with laminar flow in the measuring section, PATH A. Each of these embodiments provide a flow restrictor in the fluid path through the bypass section, PATH B, defined radially inward (or outward) flow through conduits having length to effective diameter ratios sufficiently large to assure laminar fluid flow. In each of the embodiments, the fluid being measured is gaseous, but the structure and concepts are applicable to liquids as well.

Referring now to FIGS. 2 and 3, a flowmeter 10 is illustrated incorporating a flow splitter in accordance with this invention. The flowmeter includes a housing 12 bored and counterbored to define a passageway 14 formed with inlet and outlet ports 16 and 18, respectively, for the fluid whose flow is to be measured. A reduced diameter portion 20 defines an annular shoulder 22 for receiving a flow restrictor 24 and an upstream flow directing hollow cylindrical nut 25. The flow restrictor 24 includes one or a plurality of channeled disks 27 which will be described hereinafter in more detail. A passageway region 26 is threaded and received the flow restrictor 24 and the matingly threaded cyindrical nut 25. The cylindrical nut 25 is formed with notches 30 across its far end so as to be readily threaded into the passageway 14 against flow restrictor 24 to secure the flow restrictor 24 in abutment with the shoulder 22. An expanded diameter passageway region 32 defines a shoulder 34 spaced from the end of the cylindrical nut 25 for receiving a filter screen 36. The passageway region 32 is threaded and receives a matingly threaded cylindrical securing member 38 for abutment against the filter screen 36, securing the screen 36 in place.

Upstream and downstream taps, in the form of bore holes 40 and 42, respectively, in the housing, are provided for disposing respective attachment ends 44 and 46 of a measuring section tube 48 on opposite sides of the combination of flow directing nut 25 and flow restrictor 24. The attachment ends 44 and 46 are tubular members through which the ends of the measuring section tube 48 are tightly secured, so that fluid flowing into the attachment ends 44 and 46 is conducted entirely through the measuring section tube 48. The measuring section tube is very thin and elongate; in this exemplary embodiment the tube 48 has an inside diameter of 0.010 inch and a length of 3.1 inches. Thermal elements 50 and 52 on the outside of the tube detect the mass flow rates of fluid passing through the tube 48. The method by which this is accomplished is known to the art and per se does not constitute a part of this invention.

The flow restrictor 24 consists of a plurality of juxtaposed channeled disks 27 stacked together to create a desired pressure drop and flow rate. This particular illustration incorporates seven disks each with flat parallel surfaces and 0.005 inch in width. There can be as few as 1 disk 27 or as many as 20 or more, depending upon the desired pressure drop and capacity of the housing 12.

Referring to FIGS. 4, 5 and 6, in this particular embodiment each of the disks 27 is formed flat, as a washer, with a central opening 54 through the opposite parallel surfaces. In the illustration, four conduits or channels 56 are formed through the front surface 58 of the disk radiating from the central opening 54 outwardly to the perimeter 60 of the disk. The channels 56 serve to conduct fluid from the periphery of the disk 27 to the opening 54.

Each disk should be flat and its surfaces smooth and free from burrs or unevenness that would interfere with fluid flow in the channels 56 or cause the disks 27 to be separated. Sufficient smoothness can be achieved with chemical etching. In this particular embodiment the diameter of the disk 27 is 0.480 inch, the diameter of the central opening is 0.270 inch and the length of the channel is 0.105 inch. The channel 56 is rectangular in cross-section and has height and width dimensions of 0.0025 inch and 0.0085 inch, respectively. Thus, the cross-sectional area of each channel 56 is 0.000021. The effective hydraulic radius of the channel can be calculated as the radius of a circle having an equivalent cross-sectional area; in this case the effective hydraulic radius is 0.0026 inch. Accordingly, each channel has a length to effective hydraulic radius of about 40:1. Generally, the ratio of length to effective hydraulic radius should be at least 4:1 and can be as high as 200:1 or higher. The mesh filter 36 located upstream of the flow element 24 passes 5 micron particles. In view of the much larger channel diameter, the flow element 24 is protected from clogging from contaminants in the fluid stream.

Referring back to FIG. 3, the cylindrical nut 25 operates in conjunction with the flow restrictor 27 to direct fluid through the conduits 56 radially inwardly to the central opening 54. For this purpose, the nut 25 is hollow and open at its upstream end 62 and closed at its downstream end by an end wall 64. The annular side wall 66 of the nut defines a plurality of openings 68 adjacent the end wall 64. In this embodiment four such openings are formed, each 0.093 inch in diameter. Additionally, for purposes of aligning the disks 27, three elongate cylindrical pins 70, each threaded at its end are disposed in threaded openings therefor in the downstream surface of the end wall 64. The pins jut from the end wall 64 a distance sufficient to carry the disks 27 for alignment thereof.

In assembly, the desired number of disks 27 are merely stacked on the pins 70 to define the flow element 24. The nut 66 is then threaded into the passageway region 26 so that the flow element 24 abuts the shoulder 34 and the nut end wall 64 abuts the flow element 24 and presses the component disks 27 together. No seals are required since the components can be tightly assembled. In place of the pins 70, one can provide nibs on the perimeter of the disks 27. Alternatively, one can use a jig protruding through the outlet port 18 to align the disks prior to tightening. The remainder of the flowmeter is assembled as known to the art and flowmeter electronics are assembled in the housing as known to the prior art, and which are not per se a part of the invention herein.

In operation, fluid is fed into the inlet 16 whereupon it is filtered by the filter screen 36 and travels into the hollow nut 25, through the holes 68 to the perimeters of the stacked disks 27, radially through the conduits 56, to and through the alinged disk openings 54 and emerging from the outlet 18. A portion of the fluid stream is diverted through the measuring section tube 48, flowing therethrough to meet the emerging fluid at the outlet 18. As a result of the present configuration, flow through both the measuring section tube 48 and flow element 24 are laminar, yielding accurate measurements over a substantial range of flow, temperature and pressure conditions.

The foregoing assembly provides only one flow path for PATH B referred to in FIG. 1, radially inwardly, or outward for reverse operation. Importantly, each disk 27 has sufficient thickness to retain dimensional integrity when squeezed by the nut 25. Because of the flatness of the disks 27, the flow meter is not significantly affected by variations in compressive force caused by tightening of the nut 27. Installation of the flow directing components is simple and requires no calibration adjustments for predetermined combinations of disks. Importantly, the present construction permits channels of substantial length allowing substantial cross-section for high length:hydraulic radius ratios. Accordingly, relatively large size particles can pass through the system without plugging the flow restrictor. Furthermore, the entire assembly can be formed of metal, without requiring seals, allowing use of the flow restrictor with otherwise corrosive fluids.

The particular structure of the disks 27 can be varied in number and in configuration to accomodate various flow ranges. Disks having 1–60 or more channels can be used, as well as disks having non-linear channel shapes such as will be described below, in any combination of from 1–40 disks or more to achieve any particular flow range. The desired arrangement can be obtained with simple experimentation or by calculations using the Reynold's number equation given above. Thus, it has been found that a flow range of 5 to 5,000 standard cubic centimeters per minute could be achieved by stacking 1–20 disks comprising one to three differently configurated disks having one, 10 and 50 channels. The diameter of the disk opening 54 and the diameter of the disk itself can be varied to suit particular needs.

Figure 8:
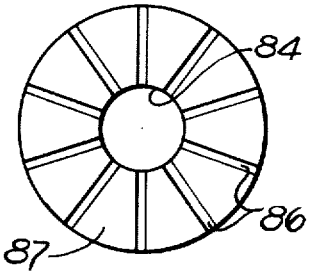
Figure 9:
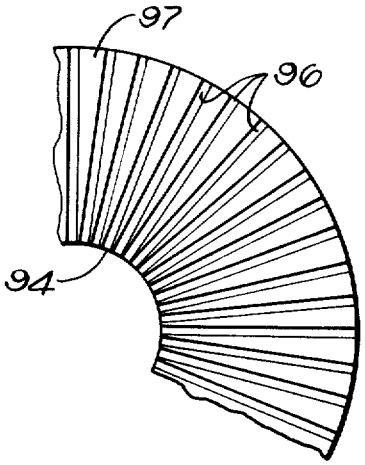

Referring to FIGS. 7–15, a variety of disk configurations are shown. In FIG. 7, a disk 77 is shown having a central opening 74 and a single channel 76 linearly formed in one surface from the opening 74 to the perimeter of the disk 77. In FIG. 8, a disk 87 is shown having a central opening 84 and 10 channels 86 radiating from the opening 84 to the disk perimeter. In FIG. 9, a disk 97 is shown having a central opening 94 and 50 radiating channels 96.

Figure 10:
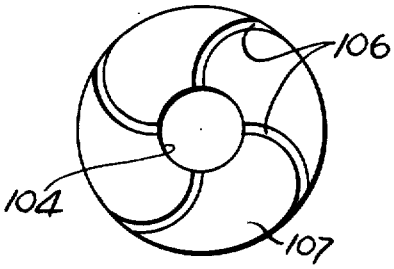

In FIG. 10, a disk 107 is shown having a central opening 104 and four curved channels 106 extending from the opening 104 to the disk perimeter in pinwheel fashion.

Figure 11:
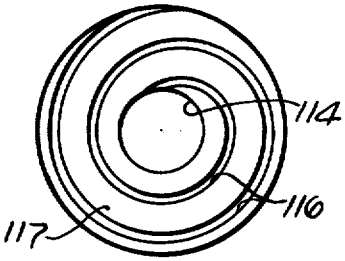

In FIG. 11, a disk 117 is shown having a central opening 114 and a single spirally formed channel 116 connecting the opening 114 to the disk perimeter.

Figure 12:
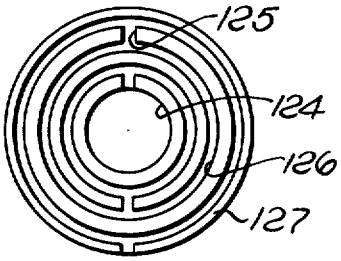

In FIG. 12, a disk 127 is shown having a central opening 124 and a series of maze-like concentric channels 126 therearound connected by short channels 125 to provide communication between the opening 124 and disk perimeter.

Figure 13:
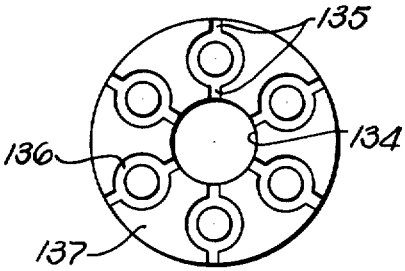

In FIG. 13, a disk 137 is shown having a central opening 134 and a plurality of circular channels 136 annularly disposed about the opening 134, connected to the opening 134 and disk perimeter by short channels 135.

Figure 14:
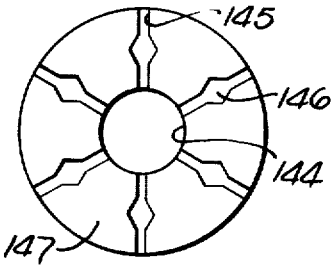

In FIG. 14 a disk 147 is shown having a central opening 144 and a plurality of diamond-shaped channels 146 annularly disposed about the opening 144, connected to the opening 144 and disk perimeter by short channels 145.

Figure 15:
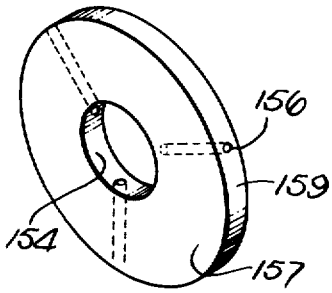
FIG. 15 is a perspective view of another alternative flow restrictor disk.

In FIG. 15, a disk 157 is shown having a central opening 154 and a plurality of channels 156 in the form of elongate conduits drilled through the body of the disk 157 from the perimeter 159 to the opening 154.

Each of the disks illustrated in FIGS. 7–15 can be substituted for one or more disks in the embodiment illustrated in FIG. 3. Other variations are also permissable; for example the opening in each disk can be off-center and means; such as a jig or appropriately spaced alignment pins on the nut 25 can be provided for alignment.

I claim:

1. A flowmeter comprising:

a housing having a fluid inlet and a fluid outlet defining a first fluid path therebetween *and aligned along a first direction*;

a flow restrictor in said first fluid path comprising at least one disk having a front surface and a rear surface connected by a perimeter surface, an opening through said front and rear surfaces and at least one conduit through said perimeter surface to said opening, said conduit being of a length to diameter ratio to provide laminar flow;

means for supporting said restrictor in said first fluid path whereby the flow therethrough is directed radially in either direction, *normal to said first direction,* between the perimeter and the opening of said at least one disk;

an elongate conduit defining a laminar flow second fluid path;

means for measuring the rate of flow of fluid through said elongate conduit; and means for connecting said second fluid path in parallel with said first fluid path on opposite flow sides of said flow element; *said housing being constructed to as to redirect said radially directed flow to flow parallel to said first direction.*

2. The flowmeter of claim 1 in which said conduit is defined as a channel through the front surface of said disk.

3. The flowmeter of claim 1 in which said conduit comprises an elongate passageway having an effective length substantially larger than the effective hydraulic radius thereof.

4. The flowmeter of claim 1 in which the ratio of the length of said passageway to the effective hydraulic radius thereof is at least 1.5:1.

5. The flowmeter of claim 1 in which said opening is centrally formed through said disk and said conduit radiates linearly therefrom to said perimeter surface.

6. The flowmeter of claim 1 in which said disk is formed flat with substantially even front and rear surfaces exclusive of said conduit.

7. The flowmeter of claim 1 in which said flow element comprises a plurality of juxtaposed disks, including said one disk, each disk having a front surface and a rear surface connected by a perimeter surface, each disk having an opening through said front and rear surfaces and at least one conduit through said perimeter surface to said opening, the opening of said plurality of disks being aligned.

8. [The flowmeter of claim 7 in which] *A flow meter comprising:*

*a housing having a fluid inlet and a fluid outlet defining a first fluid path therebetween;*

*a flow restrictor in said first fluid path comprising a plurality of juxtaposed disks, including said one disk, each disk having a front surface and a rear surface connected by a perimeter surface, each disk having an opening through said front and rear surfaces and at least one conduit through said perimeter surface to said opening, said conduit being of a length to diameter ratio to provide laminar flow,* the number of conduits carried by one of said plurality of disks [is] *being* different from the number of conduits carried by another of said plurality of disks, *the opening of said plurality of disks being aligned;*

*means for supporting said retrictor in said first fluid path whereby the flow therethrough is directed radially in either direction between the perimeter and the opening of said at least one disk;*

*an elongate conduit defining a laminar flow second fluid path;*

*means for measuring the rate of fluid through said elongate conduit; and*

*means for connecting said second fluid path and parallel with said first fluid path on opposite flow sides of said flow element.*

9. A flowmeter comprising:

a housing having a fluid inlet and a fluid outlet defining a first fluid path therebetween;

a flow restrictor in said first fluid path comprising at least one disk having a front surface and a rear surface connected by a perimeter surface, an opening through said front and rear surfaces and at least one conduit through said perimeter surface to said opening, said conduit being of a length to diameter ratio to provide laminar flow;

an elongate conduit defining a laminar flow second fluid path;

means for measuring the rate of flow of fluid through said elongate conduit; and means for connecting said second fluid path in parallel with said first fluid path on opposite flow sides of said flow element;

said housing comprising a wall defining said fluid inlet, said wall being threaded, and including a retaining member in said inlet for securing said flow restrictor in said first fluid path, said retaining member being hollow and externally threaded to mate with said housing wall thread, said retaining member being open at one end and closed at its opposite end, said opposite end of said retaining member abutting said flow restrictor at one of said front and rear surfaces thereof, and means in said housing for retaining the opposite surface of said flow restrictor against movement, said retaining member being formed with at least one lateral opening therethrough, the effective outer diameter of said flow restrictor being smaller than the effective inner diameter of said inlet whereby fluid introduced into said retaining member flows through said lateral opening, through said conduit, into said disk opening and out thereof to define said [second] *first* fluid path.

10. The flowmeter of claim 7 in which each said disk is formed with a plurality of said conduits.

* * * * *

UNITED STATES PATENT AND TRADEMARK OFFICE

CERTIFICATE OF CORRECTION

PATENT NO. : Re. 31,570

DATED : May 1, 1984

INVENTOR(S) : Charles Drexel

It is certified that error appears in the above-identified patent and that said Letters Patent are hereby corrected as shown below:

Column 1, line 24, "resistor" should be "restrictor".

Column 2, line 33, "diamter" should be "diameter".

Column 2, line 62, "FIG. 3." should be "FIG. 3;".

Column 3, line 41, "are a" should be "area".

Column 6, line 56, "means:" should be "means,".

Column 8, line 9, "rate of fluid" should be --rate of flow of fluid--.

Column 8, line 3, "retrictor" should be "restrictor".

Signed and Sealed this

Sixteenth Day of April 1985

[SEAL]

*Attest:*

DONALD J. QUIGG

*Attesting Officer*

*Acting Commissioner of Patents and Trademarks*